Oct. 23, 1945.    A. C. JACOBS    2,387,329
CONTAINER WITH HANDLE
Filed May 29, 1943
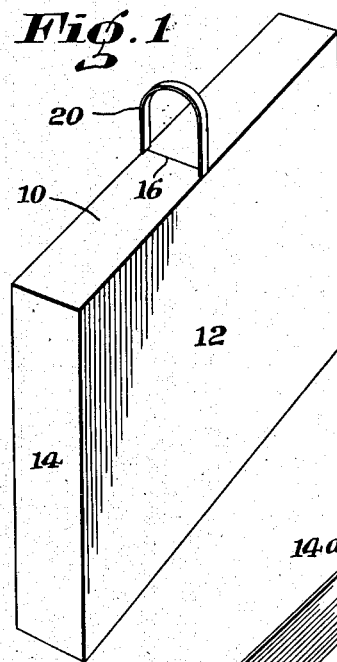
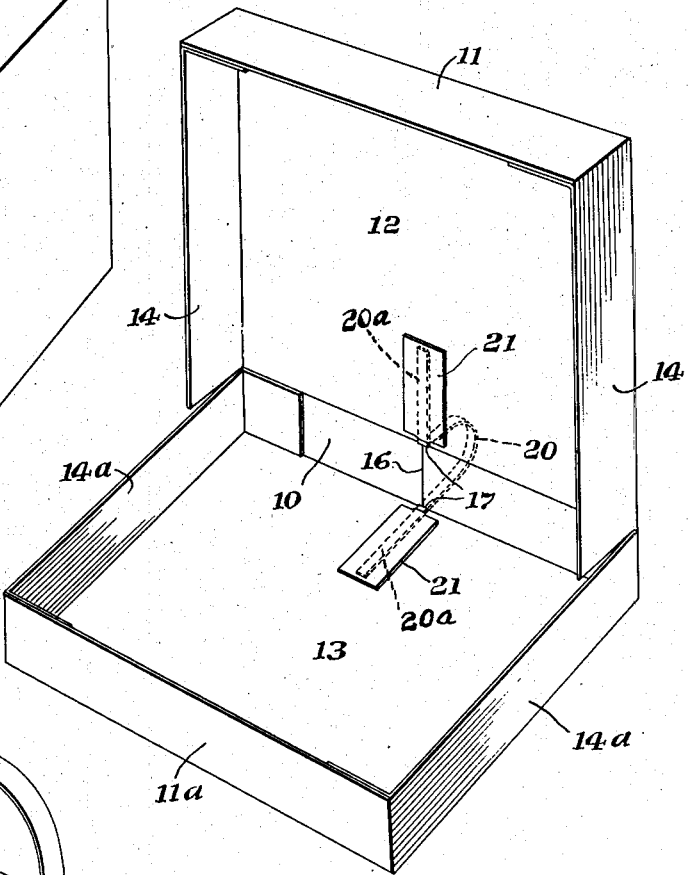
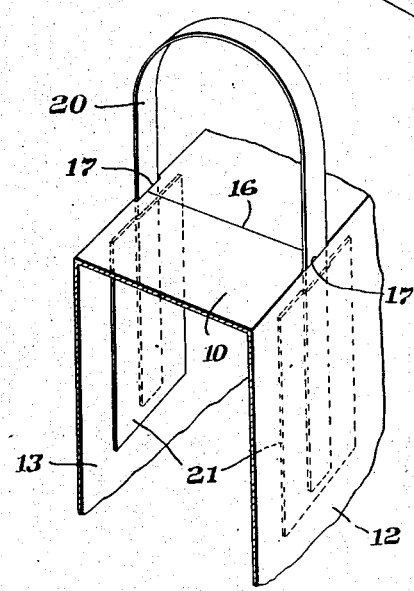
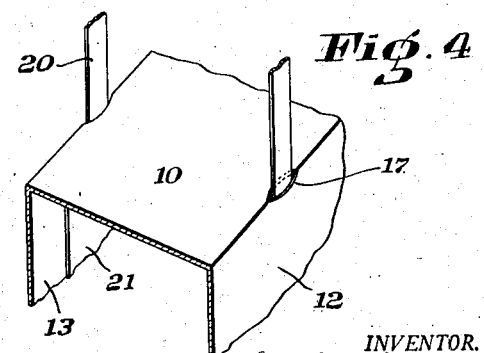
INVENTOR.
Arthur C. Jacobs
BY Harold E. Cole
ATTORNEY Patented Oct. 23, 1945

2,387,329

UNITED STATES PATENT OFFICE 2,387,329

CONTAINER WITH HANDLE

Arthur C. Jacobs, Chicago, Ill.

Application May 29, 1943, Serial No. 489,031

4 Claims. (Cl. 229—52)

This invention relates to containers, particularly of the carton type.

The principal object of my invention is to provide a container with a light flexible handle attached to it, which handle will not tend to tear or distort the container as it is carried, even though the load is heavy. This is accomplished largely by so locating the handle and distributing the stress, that there is practically no strain put on the container itself.

Another object is to provide such a handle attachment that it can be kept out of sight and within the container until it is to be used, and yet is readily and immediately accessible, and can be withdrawn from inside the container to its position of use by a single movement of the hand. Since my containers are particularly for use in stores the fact that the handle is already affixed to the container and is immediately accessible saves time for the sales people and the customers.

Still another object is to provide such a handle that is inexpensive in materials used and can readily be affixed to the box by simple operations which can be performed rapidly either by machinery or by hand.

The foregoing and other objects which will appear as the nature of the invention is better understood, may be accomplished by a construction such as is disclosed by the drawing and specification. The nature of the invention is such as to render it susceptible to various changes and modifications, and, therefore, I am not to be limited to said disclosure; but am entitled to all such changes therefrom as fall within the scope of my claims.

In the drawing:

Figure 1 is a perspective view of my container in closed position with the handle outside in the position in which it hangs on the hand or finger of the person carrying it.

Figure 2 is a perspective view of my container with the cover in open position, the handle being shown in broken lines.

Figure 3 is an enlarged, perspective fragmentary view, showing the portion of the container to which my handle is attached. Figure 4 is a similar view, with the handle broken away, of a modified form of my invention in which the handle always remains on the outside of the container.

As illustrated, my container or box has a top portion 10, an outer bottom portion 11, an inner bottom portion 11a, a front 12, a back 13, two outer end portions 14 and two inner end portions 14a. Said outer bottom 11, outer ends 14 and front 12 constitute the cover or outer section of the container. Said inner bottom 11a, said back 13 and said inner ends 14a constitute the compartment or inner section of my container. Said top 10 connects said outer section or cover and said inner section or compartment together in a one-piece container.

In said top portion 10 a cross-wise extending slit 16 is preferably made at the center, at the end extremities of which slit two longitudinally extending and smaller slits 17 are provided. A handle strip 20 preferably made of a flat piece of fabric material or strong paper extends through said cross slits 17 and beyond to provide a free loop to be grasped by the finger or hand of the person carrying the box. In the drawing the loop is shown in its extended position as when carried. Ordinarily it hangs limp if thin ribbon or paper material is used. Both ends 20a of said handle 20 extend directly downward along the inner surface of said front and back sides 12 and 13, being fastened thereto by means of the adhesive on gummed tapes 21. Said handle ends 20a preferably extend in a straight line downwardly from said longitudinal slits 17 to the point where they are fastened to said front and back sides 12 and 13. In place of an adhesive, wire staples or stitching could be used to fasten said handle ends 20a in place.

My box is preferably made of one piece of material and in this one-piece type of box the handle 20 is preferably attached thereto when the box is made and when it extends outside the box as shown in Figure 1 of the drawing it is ready for immediate use. Said handle ends 20a preferably extend directly downward through said longitudinal slits 17, being attached to said front and back 12 and 13 at points directly in alinement with said slits 17, so that the pull is straight and not angular, and the strain is absorbed by said front 12 and back 13. No strain is placed on the top portion 10 which is smaller and less able to stand the strain than said front and back 12 and 13, and there is no sawing action of the handle cord on said top 12.

The outside or loop portion of said handle 20 can be kept inside said container, in which it is out of sight. In that case it can be pushed through said slit 16 and thereby made immediately ready for use.

In the modification shown in Figure 4 of the drawing I omit said cross-wise slit 16 in said top 10, in which event the handle loop remains outside the box after the handle ends 20a are inserted through said slits 17 and attached to the front and back sides 12 and 13 respectively of the container.

It will be noted that my finished container has a handle already attached which can immediately be drawn outside the container and used, and then the only part that is visible is the carrying loop istelf. This eliminates the objection to many handles now so commonly used which are glued or otherwise affixed to the outside of the container, thus exposing the places where the attachment is made, and thereby defacing the package to that extent which is somewhat unsatisfactory in appearance to the shopping trade.

What I claim is:

1. A container comprising a compartment section, a cover section, and a top portion connecting said compartment and cover, said top portion having a cross-wise slit therein extending its full width at substantially the center thereof and having a longitudinally extending slit at each end extremity of said cross slit, and a handle member having two end portions which extend through said longitudinal slits and are fastened to said compartment and cover.

2. A container comprising a compartment section, a cover section and a top portion connecting said compartment and cover, said top portion having a cross-wise slit therein at substantially the center thereof and having shorter longitudinally extending slits at each end extremity of said cross slit, and a handle member having two end portions which extend in substantially the same vertical plane through said longitudinal slits down the interior surfaces of and are fastened to said compartment and cover.

3. A container comprising a top portion, a front portion and a back portion each connected to said top portion, two outer end portions each connected to said front portion, an outer bottom portion connected to said outer ends and front portion, an inner bottom portion connected to said back portion, and two inner end portions connected to said back and inner bottom, said top portion having a slit extending crosswise thereof its full width, and two slits extending lengthwise at each end extremity of the first said slit, and a handle the free ends of which are attached to said front and back portions respectively and extend through said two lengthwise slits and beyond in the form of a loop, said handle free ends extending to and being attached to said front and back portions at points in direct alinement with and below said lengthwise slits.

4. A container comprising a top portion, a front portion and a back portion each connected to said top portion, two outer end portions each connected to said front portion, an outer bottom portion connected to said outer ends and front portion, an inner bottom portion connected to said back portion, and two inner end portions connected to said back and inner bottom, said top portion having a slit extending crosswise thereof its full width, and two shorter slits extending lengthwise at each end extremity of the first said slit, and a handle the free ends of which are attached to said front and back portions respectively and extend through said two lengthwise slits outside of said container and beyond in the form of a loop, said handle free ends extending to and being attached to said front and back portions at points less than half the depth of said container in direct vertical alinement with said lengthwise slits so that the pull of said handle is directly and solely on said front and back.

ARTHUR C. JACOBS.